No. 739,350. PATENTED SEPT. 22, 1903.
J. F. RUTTER.
COMBINED CORN COOKER AND MIXER.
APPLICATION FILED SEPT. 15, 1902.
NO MODEL. 2 SHEETS—SHEET 1.
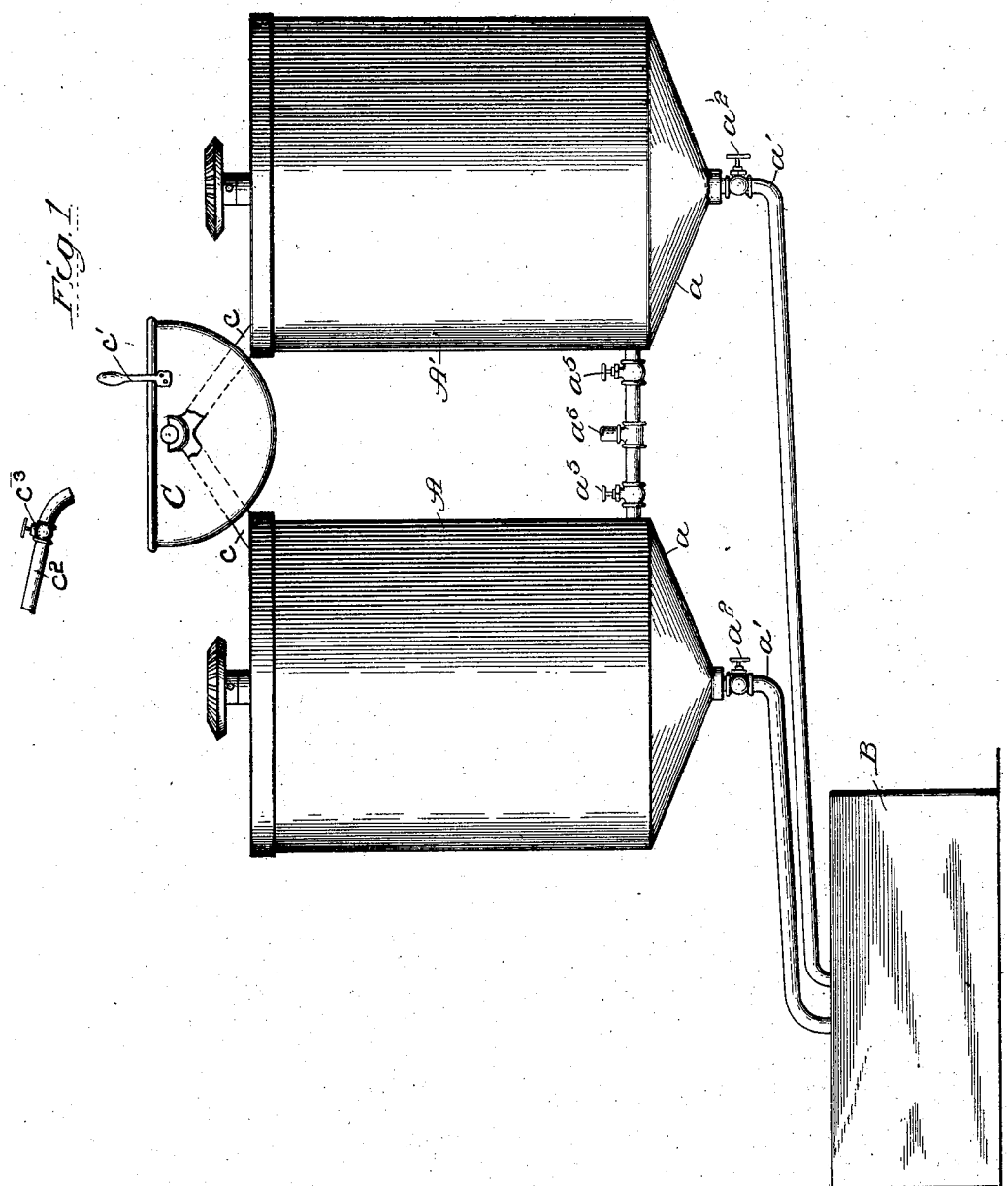

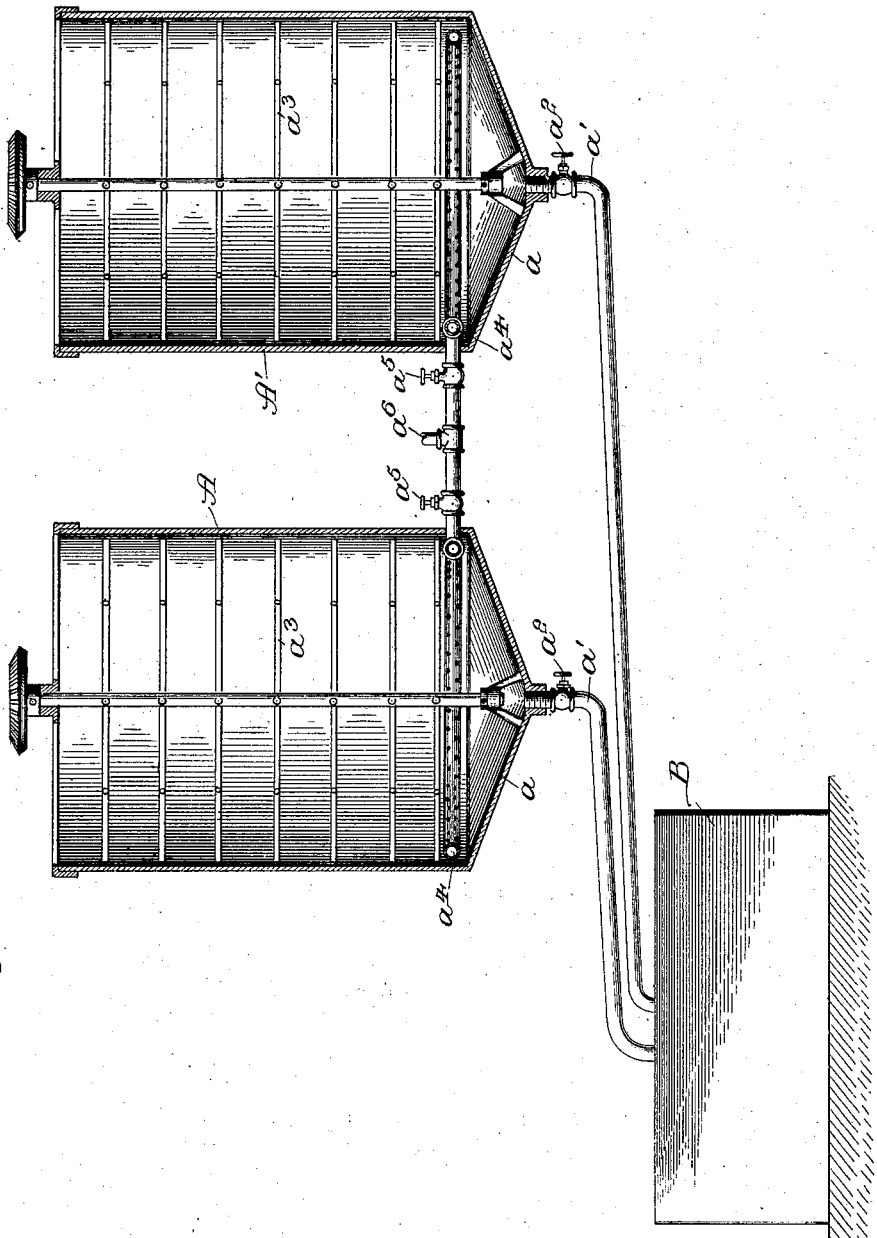

No. 739,350.

Patented September 22, 1903.

UNITED STATES PATENT OFFICE.

JOHN F. RUTTER, OF BLAIR, NEBRASKA, ASSIGNOR OF ONE-HALF TO DANIEL W. ARCHER, OF CHICAGO, ILLINOIS.

COMBINED CORN COOKER AND MIXER.

SPECIFICATION forming part of Letters Patent No. 739,350, dated September 22, 1903.

Application filed September 15, 1902. Serial No. 123,381. (No model.)

*To all whom it may concern:*

Be it known that I, JOHN F. RUTTER, a citizen of the United States, residing at Blair, in the county of Washington and State of Nebraska, have invented certain new and useful Improvements in a Combined Corn Cooker and Mixer, of which the following is a specification.

My invention relates to combined corn cookers and mixers; and it consists in certain details of organization and arrangement of parts, as hereinafter described, and particularly pointed out in the appended claims.

In the accompanying drawings, Figure 1 is a side elevation of a device embodying my invention; and Fig. 2 is a view, part in section and part in elevation, with the syrup-measuring attachment omitted.

Referring to the parts by reference-letters, A and A' represent twin tanks of suitable dimensions, in which the cooking and mixing operations are carried out. Each tank is preferably of the open variety and is provided with a sloping bottom $a$ to facilitate the discharge of the contents. In practice I prefer to provide the sloping feature of the bottom by making the same approximately funnel-shaped, as shown, whereby the material will all tend toward the center of the bottom, where it is provided with an outlet having a suitable discharge-pipe $a'$, controlled by a suitable valve, as at $a^2$. The discharge-spouts of the twin tanks lead to a can-filling machine, (represented at B.) Each tank is provided with a stirrer or mixer $a^3$ of any suitable form and driven from any suitable source of power, so as to keep the contents in an agitated state while the cooking of the corn is being accomplished. The corn is heated to any degree up to the boiling-point by means of the direct application of live steam, which is introduced into the tanks by suitable perforated pipes $a^4$, each controlled by a suitable cock $a^5$ and leading to a common source of supply, as at $a^6$.

To measure the syrup that is used to sweeten the corn, I attach to the tanks supports $c$, to which the syrup-measure C is pivoted, so that the measurer of vessel C can be turned to discharge its contents into either tank by means of a handle $c'$. The reference-letter $c^2$ shows the end of the pipe leading from the syrup-tank above to discharge the syrup or syrup-water into the measuring vessel C. This pipe is provided with a cock $c^3$ for the purpose of allowing the syrup or syrup-water to flow into the measuring vessel, as desired.

In operation the desired quantity of syrup is allowed to flow into the measuring vessel C, when the operator closes the cock $c^3$ and then discharges the syrup or sweetened water into one of the tanks which is empty, after which the corn is put into this tank and the stirring and cooking process is carried on. When the other tank is empty, the desired quantity of syrup is also admitted into the measuring vessel C and then discharged into that tank, after which the corn is placed in this tank, and the cooking and stirring process proceeds therein. By this arrangement I am able to carry on the cooking process in either tank while the companion tank is being either filled or emptied and so can proceed continuously with the treatment of the corn by alternating the tanks. This is greatly facilitated by providing the syrup-supply and the steam-supply from devices that are common to the two tanks. The syrup-measurer enables me to determine for each batch of corn the desired amount of syrup as well as the desired amount of liquid which may be mixed with the syrup in its preparation in the tank above, and a single operator can readily and with great facility operate the filling of each tank properly with syrup or syrup-water to give it the desired fluidity and sweetness.

Having described my invention, I claim—

1. In a combined mixing and cooking apparatus for corn, a pair of twin tanks, each having a funnel-shaped bottom provided with a central outlet, pipes leading from the outlets to a common point of discharge, a valve controlling each pipe, an agitator in each tank, and a circular perforated steam-pipe adjacent to the bottom of each tank, substantially as described.

2. In a combined mixing and cooking apparatus for corn, a pair of twin tanks, and a syrup-measuring vessel pivoted on supports attached to the tank and provided with means to turn it to discharge its contents into either tank, substantially as specified.

In testimony whereof I affix my signature in presence of two witnesses.

JOHN F. RUTTER.

Witnesses:
EDMUND C. JACKSON,
WM. ALLEN.